US008701178B2

(12) United States Patent
Suh et al.

(10) Patent No.: US 8,701,178 B2
(45) Date of Patent: Apr. 15, 2014

(54) METHOD AND SYSTEM FOR MANAGING MOBILITY OF ACCESS TERMINAL USING PROXY MOBILE INTERNET PROTOCOL IN A MOBILE COMMUNICATION SYSTEM, AND METHOD FOR ALLOCATING HOME ADDRESS OF ACCESS TERMINAL FOR THE SAME

(75) Inventors: Kyung-Joo Suh, Seoul (KR); Jung-Soo Jung, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1274 days.

(21) Appl. No.: 12/124,315

(22) Filed: May 21, 2008

(65) Prior Publication Data
US 2008/0295154 A1 Nov. 27, 2008

(30) Foreign Application Priority Data

May 21, 2007 (KR) .................. 10-2007-0049341

(51) Int. Cl.
G06F 21/00 (2013.01)
(52) U.S. Cl.
USPC ............. 726/12; 370/254; 370/331; 370/390; 455/442; 709/223; 713/155; 726/4; 726/5
(58) Field of Classification Search
USPC ........................................... 726/12
See application file for complete search history.

(56) References Cited

U.S. PATENT DOCUMENTS

| 6,418,130 | B1* | 7/2002 | Cheng et al. | 370/331 |
| 7,764,948 | B2* | 7/2010 | Lee et al. | 455/410 |
| 7,840,217 | B2* | 11/2010 | Patel et al. | 455/439 |
| 7,911,973 | B2* | 3/2011 | Kumazawa et al. | 370/254 |
| 2003/0204744 | A1* | 10/2003 | Maltais et al. | 713/201 |
| 2007/0207818 | A1* | 9/2007 | Rosenberg et al. | 455/461 |
| 2007/0242638 | A1* | 10/2007 | Arkko et al. | 370/331 |
| 2007/0260885 | A1* | 11/2007 | Yegani et al. | 713/171 |
| 2008/0059792 | A1* | 3/2008 | Feder et al. | 713/155 |
| 2008/0134315 | A1* | 6/2008 | Tamura et al. | 726/12 |
| 2008/0159227 | A1* | 7/2008 | Ulupinar et al. | 370/331 |
| 2008/0263631 | A1* | 10/2008 | Wang et al. | 726/2 |
| 2008/0270794 | A1 | 10/2008 | Falk et al. | |
| 2009/0193253 | A1 | 7/2009 | Falk et al. | |
| 2010/0017601 | A1 | 1/2010 | Falk et al. | |

FOREIGN PATENT DOCUMENTS

| KR | 1020060058831 | 6/2006 |
| WO | WO 2007/051768 | 5/2007 |
| WO | WO 2007/051776 | 5/2007 |
| WO | WO 2007/051787 | 5/2007 |

OTHER PUBLICATIONS

Mobility management for voip service: mobile ip vs. sip|http://stargate.cnl.tuke.sk/~jozjan/dwl/voip/Remote%20Publications/Mobility%20management%20for%20VoIP%20service%20-%20Mobile%20IP%20vs%20SIP.pdf|Kwon et al|2002|pp. 66-75.*

* cited by examiner

Primary Examiner — Mahfuzur Rahman
(74) Attorney, Agent, or Firm — The Farrell Law Firm, P.C.

(57) ABSTRACT

A method for managing mobility of an Access Terminal (AT) using a Proxy Mobile Internet Protocol in a mobile communication system. Access authentication is performed between the AT and an Authentication, Authorization and Accounting server. The AT sends a Dynamic Host Configuration Protocol (DHCP) Server Discover message including information for authentication check to an Access Gateway (AG) while performing the access authentication. The AG sends a Proxy Registration Request message including information for mobility management for the AT to a Home Agent (HA). The AG receives from the HA a Proxy Registration Response message indicating a successful reception of the Proxy Registration Request message. The AG sends a DHCP Offer message including a Home Address (HoA) of a corresponding AT and sends a DHCP Acknowledgement message for accepting use of the HoA, to the AT, when the AT notifies the AG of its intention to use the HoA.

15 Claims, 6 Drawing Sheets

METHOD AND SYSTEM FOR MANAGING MOBILITY OF ACCESS TERMINAL USING PROXY MOBILE INTERNET PROTOCOL IN A MOBILE COMMUNICATION SYSTEM, AND METHOD FOR ALLOCATING HOME ADDRESS OF ACCESS TERMINAL FOR THE SAME

PRIORITY

This application claims priority under 35 U.S.C. §119(a) of a Korean Patent Application filed in the Korean Intellectual Property Office on May 21, 2007 and assigned Serial No. 2007-49341, the disclosure of which is incorporated herein by reference.

BACKGROUND OF THE INVENTION

1. Field of the Invention

The present invention relates generally to a method and system for managing mobility of an access terminal in a mobile communication system, and in particular, to a method and system for managing mobility of an Access Terminal (AT) using Proxy Mobile Internet Protocol (PMIP) and Dynamic Host Configuration Protocol (DHCP) for an AT that uses Simple Internet Protocol (IP).

2. Description of the Related Art

In mobile communication systems such as $3^{rd}$ Generation Partnership Project 2 (3GPP2) Code Division Multiple Access (CDMA) 1x and Evolution Data Only (EV-DO), an Access Network (AN) manages many radio-related resources, and a Packet Data Serving Node (PDSN), which is a separate entity of the core network, performs a procedure related to communication of packet data.

The conventional mobile communication systems have provided mobility for an AT by using Simple IP or by using Mobile IP in the mobile environment. However, Mobile IP methods, e.g., Client Mobile IP version 6 (CMIPv6) and Client Mobile IP version 4 (CMIPv4), are unsuitable for Ultra Mobile Broadband (UMB), which is an improved 3GPP2 scheme intended to send a greater amount of data at higher speed. Therefore, Proxy Mobile IP (PMIP) is now under discussion as one of the schemes capable of efficiently supporting UMB.

Simple IP, which is used in the conventional 1x or EV-DO system, does not undergo authentication for IP services except for access authentication, and after the access authentication is simply performed using the address allocated in the PDSN, there is no additional security procedure for the IP services. However, CMIPv4 needs a long time for the access and call processing process. That is, compared with Simple IP, CMIPv4, though it provides mobility, suffers from longer time delay due to the time required for a call processing process and database management for mobility support in its access and call processing.

In addition, the conventional system may complement the authentication and security processing in order to address the security problem occurring in CMIPv4, but the complementation may cause an additional time delay.

SUMMARY OF THE INVENTION

Accordingly, the present invention has been designed to address at least the problems and/or disadvantages occurring in the prior art and to provide at least the advantages described below. An aspect of the present invention provides a method and system for fast mobility support and secure, efficient communication based on Proxy Mobile IP version 4 (PMIPv4) in a mobile communication system.

Another aspect of the present invention provides a method and system for efficiently performing PMIPv4 authentication and call setup in an initial call setup process of a mobile communication system.

Another aspect of the present invention provides a method and system for performing IP-based authentication and security using an Authentication, Authorization, and Accounting (AAA) server in a mobile communication network.

Yet another aspect of the present invention provides a method for managing mobility of an Access Terminal (AT) using PMIPv4 in an Access Gateway (AG) that performs a Dynamic Host Configuration Protocol (DHCP) function.

Another aspect of the present invention provides a home address allocation method and system for mobility support of an AT in a mobile communication system including an AG that performs a DHCP function.

In accordance with an aspect of the present invention, there is provided a method for managing mobility of an Access Terminal (AT) using a Proxy Mobile Internet Protocol (PMIP) in a mobile communication system. The mobility management method includes performing access authentication between the AT and an Authentication, Authorization, and Accounting (AAA) server; sending, by the AT, a Dynamic Host Configuration Protocol (DHCP) Server Discover message including first relevant information for authentication check to an Access Gateway (AG), while performing the access authentication; upon receipt of the DHCP Server Discover message, sending, by the AG, a Proxy Registration Request message including second relevant information for mobility management for the AT to a Home Agent (HA) on behalf of the AT; receiving, by the AG, a Proxy Registration Response message indicating a success in reception of the Proxy Registration Request message, from the HA; upon receipt of the Proxy Registration Response message, sending, by the AG, a DHCP Offer message including a Home Address (HoA) of a corresponding AT, to the AT; and sending, by the AG, a DHCP Acknowledgement (ACK) message for accepting use of the HoA, to the AT, when the AT notifies the AG of its intention to use the HoA.

In accordance with another aspect of the present invention, there is provided a mobile communication system using a Proxy Mobile Internet Protocol (PMIP). The mobile communication system includes an Access Terminal (AT) for sending to the mobile communication system a Dynamic Host Configuration Protocol (DHCP) Server Discover message including first relevant information for a check of access authentication, while performing access authentication; an Authentication, Authorization, and Accounting (AAA) server for performing the access authentication on the AT; a Home Agent (HA) for performing mobility management on the AT; and an Access Gateway (AG) for sending a Proxy Registration Request message including second relevant information for mobility management for the AT to the HA on behalf of the AT upon receipt of the DHCP Server Discover message from the AT, and sending to the AT a DHCP Offer message including a Home Address (HoA) of a corresponding AT, upon receipt of a Proxy Registration Response message indicating a successful reception of the Proxy Registration Request message from the HA.

In accordance with another aspect of the present invention, there is provided a Home Address (HoA) allocation method for mobility support of an Access Terminal (AT) in a mobile communication system using a Proxy Mobile Internet Protocol (PMIP). The HoA allocation method includes: upon receiving from the AT a Dynamic Host Configuration Protocol (DHCP) Server Discover message for a check of access authentication, sending, by an Access Gateway (AG), a Proxy Registration Request message for mobility management for the AT to a Home Agent (HA) on behalf of the AT; and allocating, by the AG, a HoA of a corresponding AT to the AT by performing a DHCP function, upon receiving from the HA a Proxy Registration Response message indicating a successful reception of the Proxy Registration Request message, and sending a DHCP Offer message with the HoA to the AT.

In accordance with another aspect of the present invention, there is provided a mobile communication system using a Proxy Mobile Internet Protocol (PMIP). The mobile communication system includes a Home Agent (HA) for performing mobility management on an Access Terminal (AT); and an Access Gateway (AG) for, upon receiving from the AT a Dynamic Host Configuration Protocol (DHCP) Server Discover message for a check of access authentication, sending a Proxy Registration Request message for mobility management for the AT to the HA on behalf of the AT, allocating a Home Address (HoA) of a corresponding AT to the AT by performing a DHCP function upon receiving from the HA a Proxy Registration Response message indicating a successful reception of the Proxy Registration Request message, and sending a DHCP Offer message with the HoA to the AT.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operators' intention, or usual practices. Therefore, the definition of the terms should be made based on contents throughout the specification.

The present invention, described below, is designed to provide address allocation and security through Proxy Mobile IPv4 for a mobile communication network. Although a detailed description of the present invention will be given herein with reference to 3GPP2-based UMB system, Evolved Packet Core (EPC), which is an evolved 3GPP mobile communication system, or evolved system of Worldwide Interoperability for Microwave Access (WiMAX), it will be understood by those skilled in the art that the proposed Internet communication method for a mobile communication network can be applied to other mobile communication systems having the similar technical background and channel format, with a slight modification, without departing from the spirit and scope of the invention.

Figure 1:
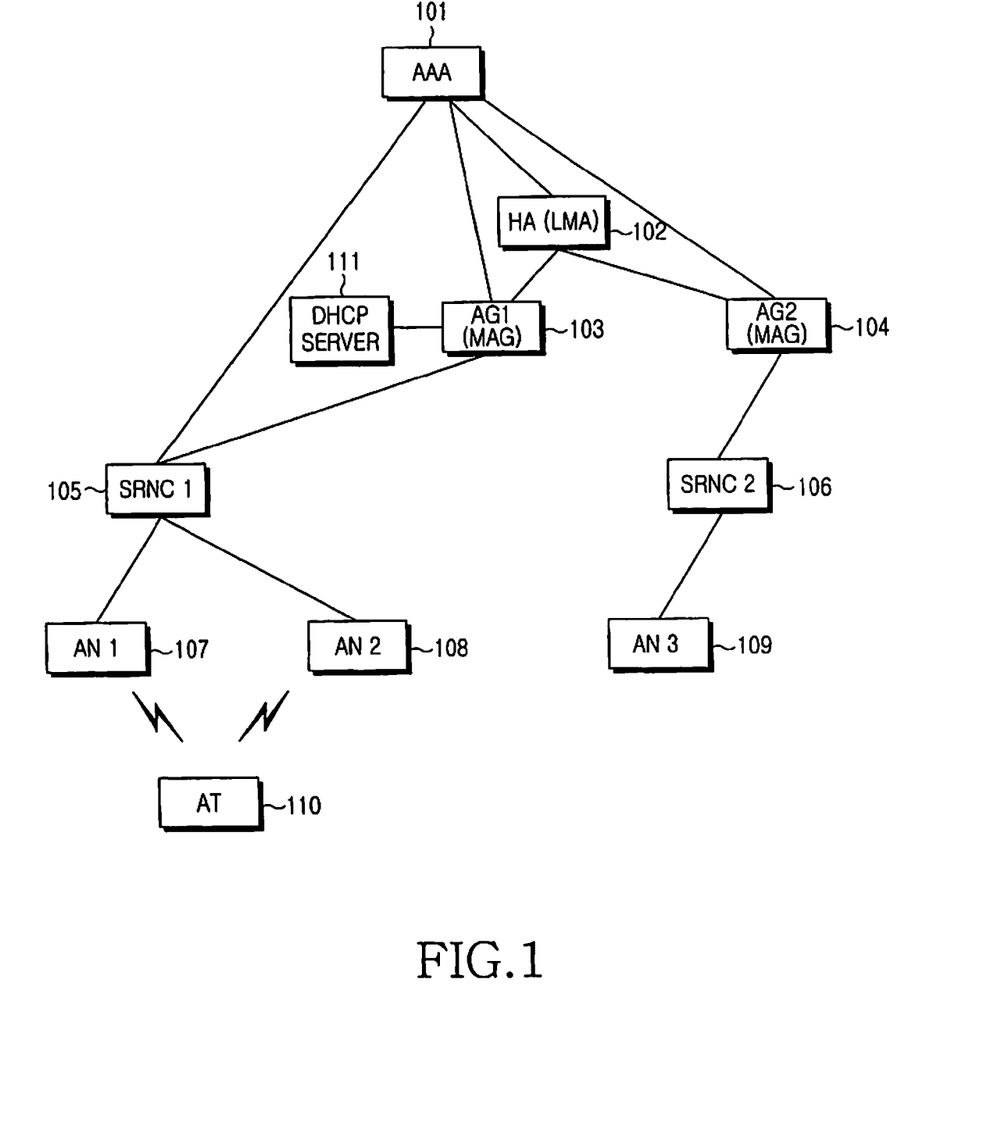
FIG. 1 is a block diagram illustrating a mobile communication network environment according to an embodiment of the present invention.

FIG. 1 is a block diagram illustrating a mobile communication network environment according to an embodiment of the present invention. More specifically, a network configuration of a 3GPP2 UMB system is illustrated herein, by way of example.

Referring to FIG. 1, Access Networks (ANs) 107, 108, and 109 set up radio bearers to an Access Terminal (AT) 110 located in their service areas or cells, and communicate through the set radio bearers. Signaling Radio Network Controllers (SRNCs) 105 and 106, when the AT 110 is in an idle mode, control communication of the AT 110 through the ANs 107, 108, and 109. The AT 110 is a device for accessing a packet data network such as the Internet via Access Gateways (AGs) 103 and 104. Herein, a Home Agent (HA) 102 and an Authentication, Authorization, and Accounting (AAA) server 101 are illustrated as the major network entities of the packet data network. The HA 102 is also known as Localized Mobility Anchor (LMA), and the AGs 103 and 104 are also known as Mobile Access Gateway (MAG). When an authenticator for authentication is present in the SRNCs 105 and 106, the SRNCs 105 and 106 are used through interfaces with the AAA server 101, for authentication.

Interfaces for managing mobility of the AT 110 in the idle state are present between ANs 107-109 and SRNCs 105 and 106, and between AGs 103 and 104 and SRNCs 105 and 106, and data paths are present between the AGs 103 and 104 and the ANs 107-109. For authentication of the AT 110, an authenticator (not shown) for authentication can be situated in the SRNCs 105 and 106.

The AT 110 supports Simple IPv4 rather than CMIPv4, and an IP address for the AT 110 is generated through a process of receiving an IP address by means of a DHCP server 111. When the DHCP server 111 exists as a separate entity, the AGs 103 and 104 serve as DHCP relays. However, when the DHCP server 111 does not separately exist, the AG 103 serves as the DHCP server 111, and can allocate an IP address to the AT 110.

Figure 2A:
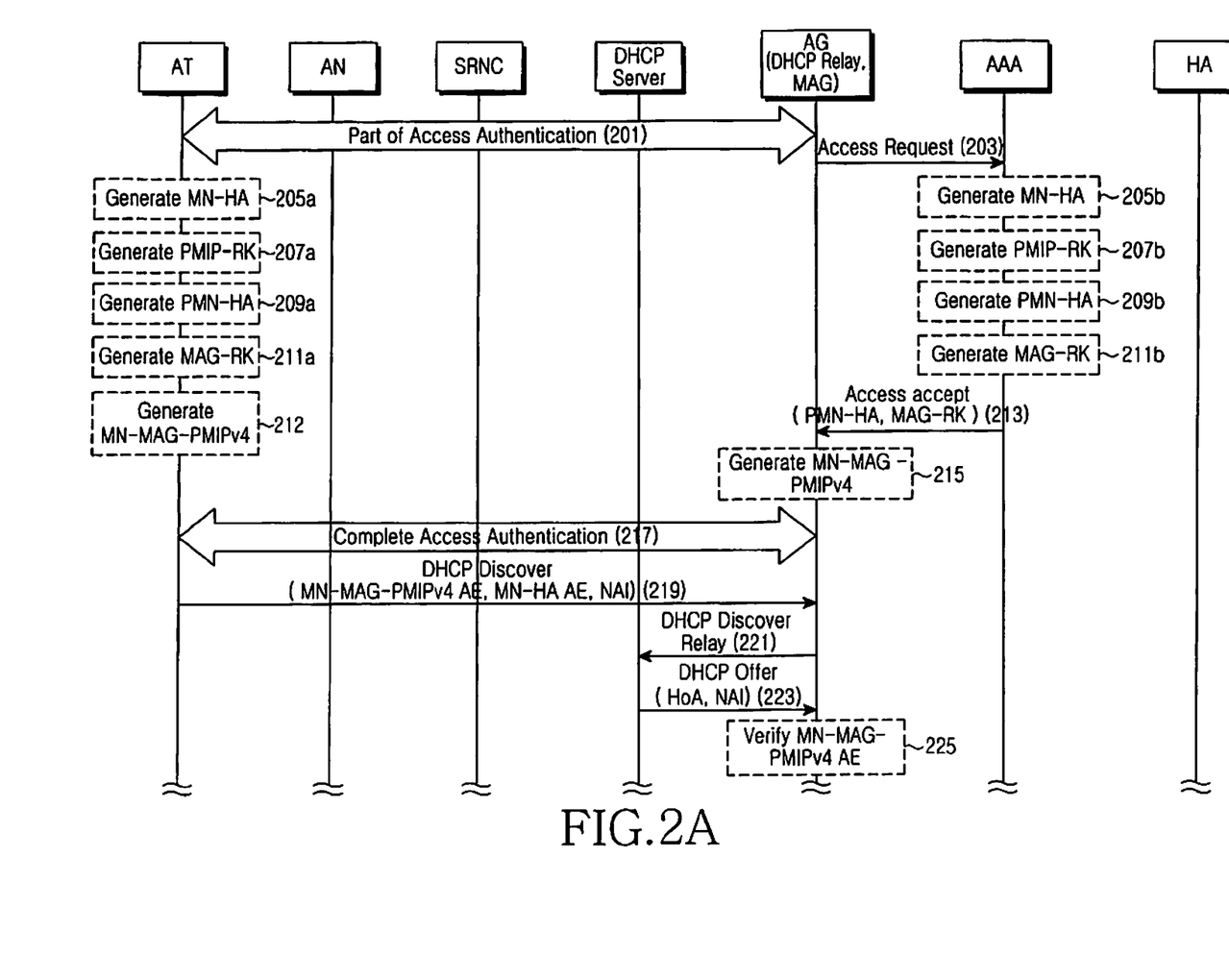
FIGS. 2A and 2B are message flow diagrams illustrating an address allocation, access, and authentication procedure in a mobile communication system according to an embodiment of the present invention.
Figure 2B:
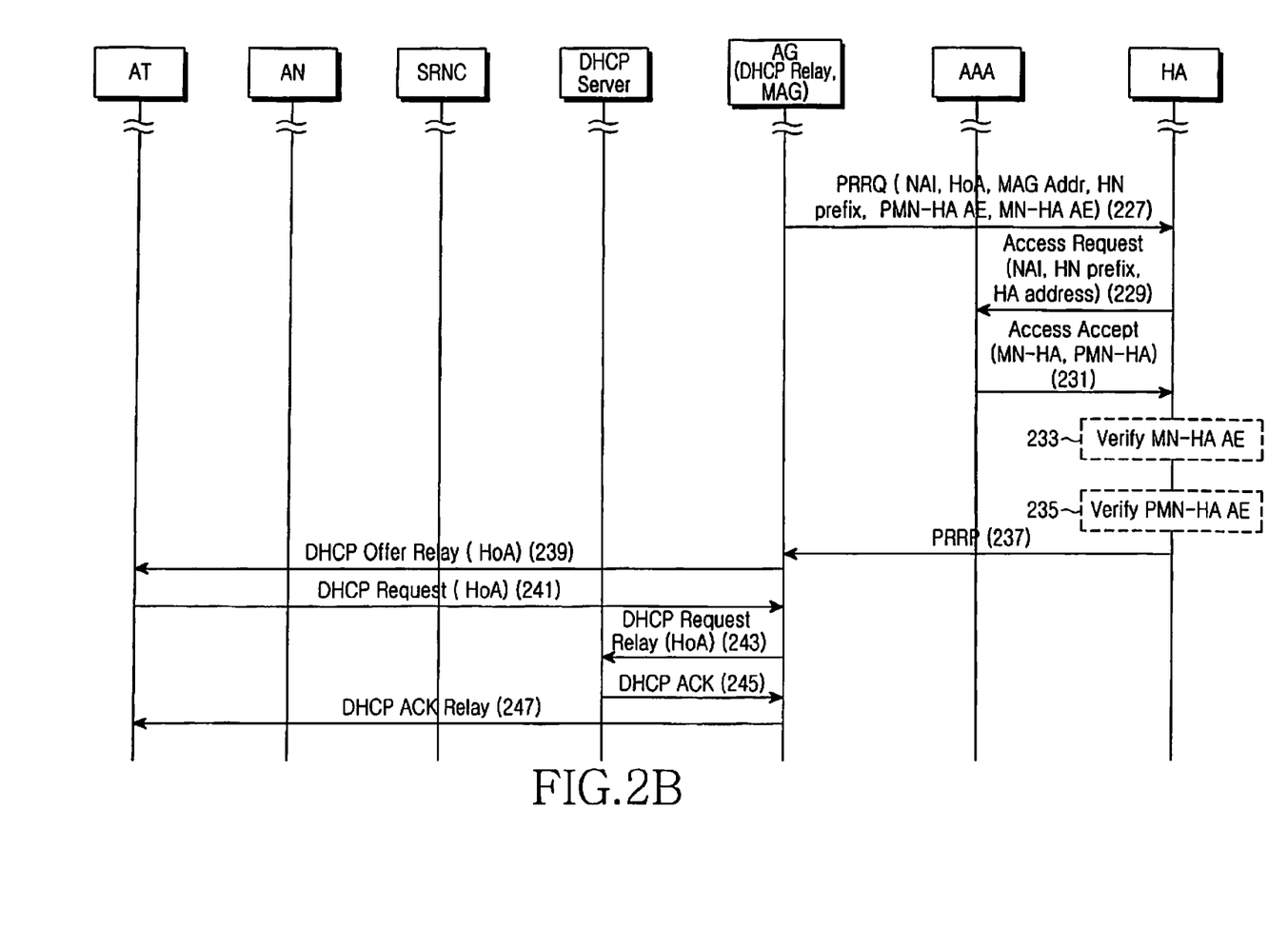

FIGS. 2A and 2B are message flow diagrams illustrating an address allocation, access, and authentication procedure in a mobile communication system according to an embodiment of the present invention. More specifically, FIGS. 2A and 2B illustrate an example in which an AG serves as a DHCP relay, and participates in a process of allocating an address of an AT.

Referring to FIGS. 2A and 2B, in step 201, an AT, an AN, and an SRNC initialize an access authentication process with an AAA server, and perform a partial process of authentication. Several procedures and several entities (e.g., AT, AN, SRNC, AG, etc.) are involved in the partial process of access authentication, and the basic operations of the entities, except for the address allocation, access, and authentication procedure are not specifically related to the present invention, so a detailed description thereof will be omitted.

In step 203, the AG sends an Access Request message to the AAA server as a part of the access authentication process of the AT. Thereafter, in steps 205a and 205b, the AT and the AAA server each generate a Mobile Node-Home Agent (MN-HA) key, for mutual authentication between the AT and the HA. The MN-HA keys generated in steps 205a and 205b can be generated using a Mobile IP-Root Key (MIP-RK) generated in steps 207a and 207b. In this case, the process of steps 205a and 205b is performed after steps 207a and 207b.

In steps 207a and 207b, the AT and the AAA server each generate a Proxy Mobile IP-Root Key (PMIP-RK). In steps 209a and 209b, the AT and the AAA server each generate a Proxy Mobile Node-Home Agent (PMN-HA) key using the PMIP-RK. The PMN-HA key is used later for mutual authentication between the AG and the HA in step 235.

In steps 211a and 211b, the AT and the AAA server each generate a Mobile Access Gateway-Root Key (MAG-RK). The MAG-RK can be used in steps 212 and 215 when the AT and the AG each generate an MN-MAG-PMIPv4 key for authenticating each other. In step 213, the AAA server sends an Access Accept message to the AG in response to the Access Request message, and the Access Accept message includes the PMN-HA key and MAG-RK generated in steps 209 and 211, respectively. Thereafter, the remaining Access Accept process in which the AG, the SRNC, the AN, and the AT are involved is performed in step 217, completing the Access Accept process.

Because the key generation is not specifically related to the present invention, a detailed description thereof will be omitted herein. Among the foregoing keys, the root keys are used for generating keys for mutual authentication between entities, and the keys other than the root keys are used for mutual authentication between the entities later in call processing. That is, the keys other than the root keys are used for generating and verifying MN-MAG-PMIPv4 Authentication Extension (AE), MN-HA AE, or PMN-HA AE.

In step 219, the AT sends a DHCP Server Discover (DHCP Discover) message to the AG to request a search for a proper address allocation server. In this case, the DHCP Server Discover message includes (i) an MN-MAG-PMIPv4 AE, which is generated from the MN-MAG-PMIPv4 key generated by the AT, and is to be used later for mutual authentication between the AT and the AG, (ii) an MN-HA AE which is generated from the MN-HA key, to be used later for mutual authentication between the AT and the HA, and (iii) a Network Access Identifier (NAI) of the AT.

In step 221, the AG, serving as a DHCP relay, relays the DHCP Server Discover message to a DHCP server, to notify the presence of a request for a search for the DHCP server from the AT. In step 223, the DHCP server sends a DHCP Offer message to the AG in response to the relay-received DHCP Server Discover message. The DHCP Offer message includes Home Address (HoA) and NAI allocated by the DHCP server, both to be used by the AT. In step 225, the AG verifies the MN-MAG-PMIPv4 AE received in step 219 using the MN-MAG-PMIPv4 key generated in step 215, to make an attempt to authenticate the AT. Herein, step 225 may be performed after step 219.

After a success in verification of the MN-MAG-PMIPv4 AE, the AG sends a Proxy Registration Request (PRRQ) message to the HA on behalf of the AT in step 227, and the PRRQ message is used by the AG to send a registration request for the moving situation of the AT to the HA on behalf of the AT. The PRRQ message, unlike the Registration Request (RRQ) message used in common Mobile IPv4, includes at least one of a PMN-HA AE, an MN-HA AE, an NAI, an HoA, an address of AG, and a Home Network Prefix (HN Prefix) of AT, in order for the AG to make movement management of the AT on behalf of the AT. Among the AEs being sent, the PMN-HA AE is generated in the AG using, for example, the PMN-HA key.

In step 229, the HA sends an Access Request message to the AAA server, to notify the presence of an Access Request that the AG sent on behalf of the AT. The Access Request message is an AAA Access Request message such as an Access Request message based on Remote Authentication Dial-in User Service (RADIUS) protocol, or an Access Request message based on Diameter AAA protocol. The Access Request message includes at least one of an NAI, an HN Prefix, and an HA address, to be used later as database information for the AT.

In step 231, an Access Accept message is sent from the AAA server to the HA, in response to the Access Request message. The Access Accept message is an Access Accept message based on RADIUS protocol, or an Access Answer message based on Diameter AAA protocol. The Access Accept message includes the MN-HA key and the PMN-HA key generated in steps 205b and 209b. In steps 233 and 235, the HA verifies the MN-HA AE and The PMN-HA AE received in step 227, using the keys received in step 231. After a success in the verification, a Proxy Registration Response (PRRP) message indicating that the registration request that the AG sent on behalf of the AT has been successfully received at the HA, is sent from the HA to the AG in step 237.

In step 239, the AG relays the DHCP Offer message to the AT, and the relayed DHCP Offer message includes an AT's IP address, i.e., HoA, allocated from the DHCP server. In step 241, the AT sends a DHCP Request message to the AG to notify whether it will use the HoA provided from the DHCP server through the AG, and in this case, the AT indicates its intention to use the HoA by sending the address HoA provided from the DHCP server along with the DHCP Request message. In step 243, the AG relays the DHCP Request message with HoA to the DHCP server to notify the presence of a request intention to use the address provided by the DHCP server from the AT. In step 245, the DHCP server sends a DHCP Acknowledgement (ACK) message to the AG in response to the receipt, from the AG, of the accept relay for the use of an address of the AT for the address allocated to the AT by the DHCP server. In step 247, the AG relays the DHCP ACK message to the AT.

Although the process of steps 227 to 237 is followed herein by the process of steps 239 to 247 for illustrative purposes, the process of steps 227 to 237 and the process of steps 239 to 247 can be performed in parallel.

Figure 3A:
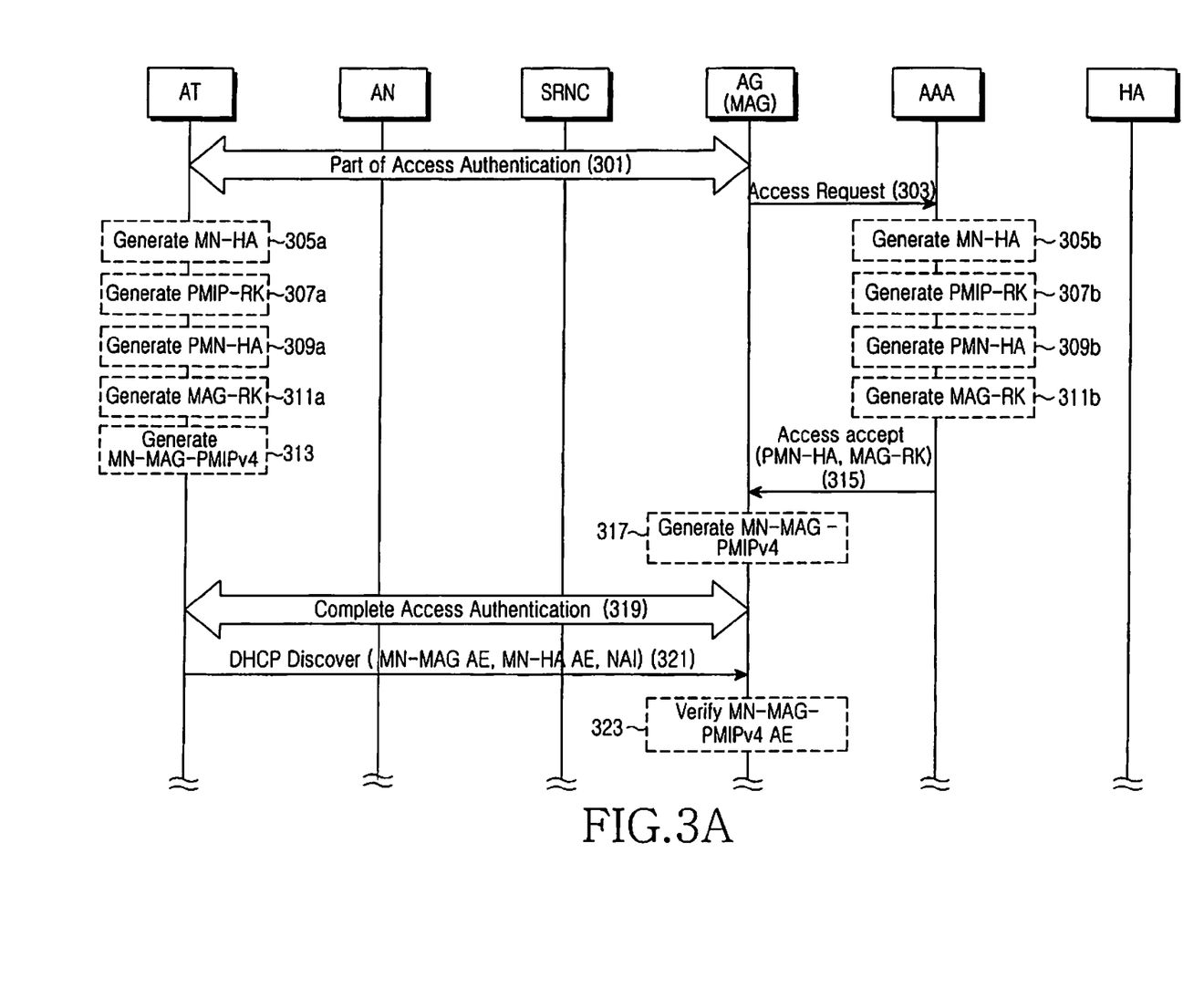
FIGS. 3A and 3B are message flow diagrams illustrating an address allocation, access, and authentication procedure in a mobile communication system according to an embodiment of the present invention.
Figure 3B:
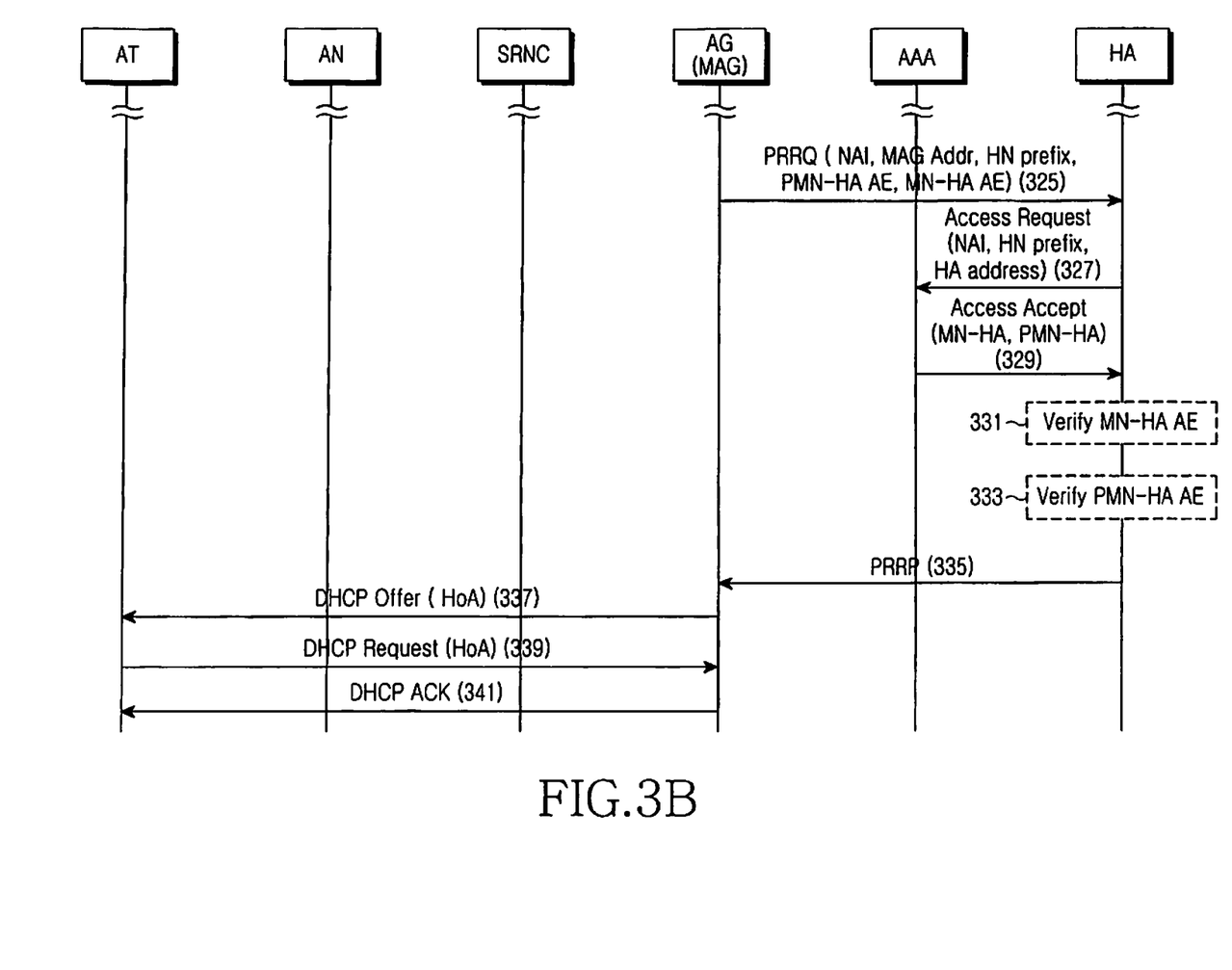

FIGS. 3A and 3B are message flow diagrams illustrating an address allocation, access, and authentication procedure in a mobile communication system according to another embodiment of the present invention. In the exemplary operation illustrated herein, an AG allocates an IP address, thereby controlling a partial function of the DHCP server.

Referring to FIGS. 3A and 3B, in step 301, an AT, an AN, and an SRNC initialize an access authentication process with an AAA server, and perform a partial process of the access authentication. Several procedures and several entities (e.g., an AT, an AN, an SRNC, an AG, etc.) are involved in the partial process of access authentication, and they are not specifically related to the present invention, so a detailed description thereof will be omitted.

In step 303, the AG sends an Access Request message to the AAA server as a part of the access authentication process of the AT. Thereafter, in steps 305a and 305b, the AT and the AAA server each generate an MN-HA key, for mutual authentication between AT and HA. The MN-HA keys generated in steps 305a and 305b can be generated using MIP-RK generated in steps 307a and 307b, and in this case, steps 305a and 305b are performed after steps 307a and 307b. In steps 307a and 307b, the AT and the AAA server each generate a PMIP-RK. In steps 309a and 309b, the AT and the AAA server each generate a PMN-HA key using the PMIP-RK. The PMN-HA key is used later for mutual authentication between the AG and the HA in step 333.

In steps 311a and 311b, the AT and the AAA server each generate an MAG-RK. The MAG-RK can be used in steps 313 and 317 when the AT and the AG each generate an MN-MAG-PMIPv4 key for authenticating each other. In step 315, the AAA server sends an Access Accept message to the AG; and the Access Accept message includes the PMN-HA key and the MAG-RK generated in steps 309 and 311, respectively. Thereafter, the remaining Access Accept process in which the AG, the SRNC, the AN, and the AT are involved is performed in step 319, thereby completing the Access Accept process.

In step 321, the AT sends a DHCP Server Discover message to the AG to request a search for a proper address allocation server. In this case, the DHCP Server Discover message includes (i) an MN-MAG-PMIPv4 AE which is generated from the MN-MAG-PMIPv4 key generated by the AT, and is to be used later for mutual authentication between the AT and the AG, (ii) an MN-HA AE which is generated from the MN-HA key, to be used later for mutual authentication between the AT and the HA, and (iii) an NAI of the AT. In step 323, the AG verifies the MN-MAG-PMIPv4 AE received in step 321, using the MN-MAG-PMIPv4 key generated in step 317.

After a success in verification of the MN-MAG-PMIPv4 AE, the AG sends a PRRQ message to the HA on behalf of the AT in step 325, and the PRRQ message is used by the AG to send a registration request for the moving situation of the AT to the HA on behalf of the AT. The PRRQ message, unlike the RRQ message used in common Mobile IPv4, includes at least one of a PMN-HA AE, an MN-HA AE, an NAI, an HoA, an address of an AG, and an HN Prefix of an AT, in order for the AG to make movement management of the AT on behalf of the AT.

In step 327, the HA sends an Access Request message to the AAA server, to notify the presence of an Access Request that the AG sent on behalf of the AT. The Access Request message is an AAA Access Request message such as an Access Request message based on RADIUS protocol, or an Access Request message based on Diameter AAA protocol. The Access Request message includes at least one of an NAI, an HN Prefix, and an HA address, to be used later as database information for the AT.

In step 329, an Access Accept message is sent from the AAA server to the HA in response to the Access Request message. The Access Accept message is an Access Accept message based on RADIUS protocol, or an Access Answer message based on Diameter AAA protocol. The Access Accept message includes the MN-HA key and the PMN-HA key generated in steps 305b and 309b. In steps 331 and 333, the HA verifies the MN-HA AE and the PMN-HA AE received in step 325, using the keys received in step 329. After a success in the verification, the HA sends in step 335 to the AG a PRRP message indicating that the PRRQ that the AG sent on behalf of the AT has been successfully received at the HA.

In step 337, the AG sends a DHCP Offer message to the AT, and the DHCP Offer message includes a home address HoA allocated by the AG, to be used by the AT, before being transmitted. In step 339, the AT sends a DHCP Request message to the AG to notify whether it will use the HoA provided from the AG, and in this case, the AT indicates an intention to use the HoA by sending the address HoA allocated by the AG along with the DHCP Request message. Thereafter, in step 341, the AG sends a DHCP ACK message to the AT to formally accept the use of the HoA given to the AT.

Although steps 325 to 335 are followed herein by steps 337 to 341, steps 325 to 335 and steps 337 to 341 can be carried out in parallel.

Figure 4:
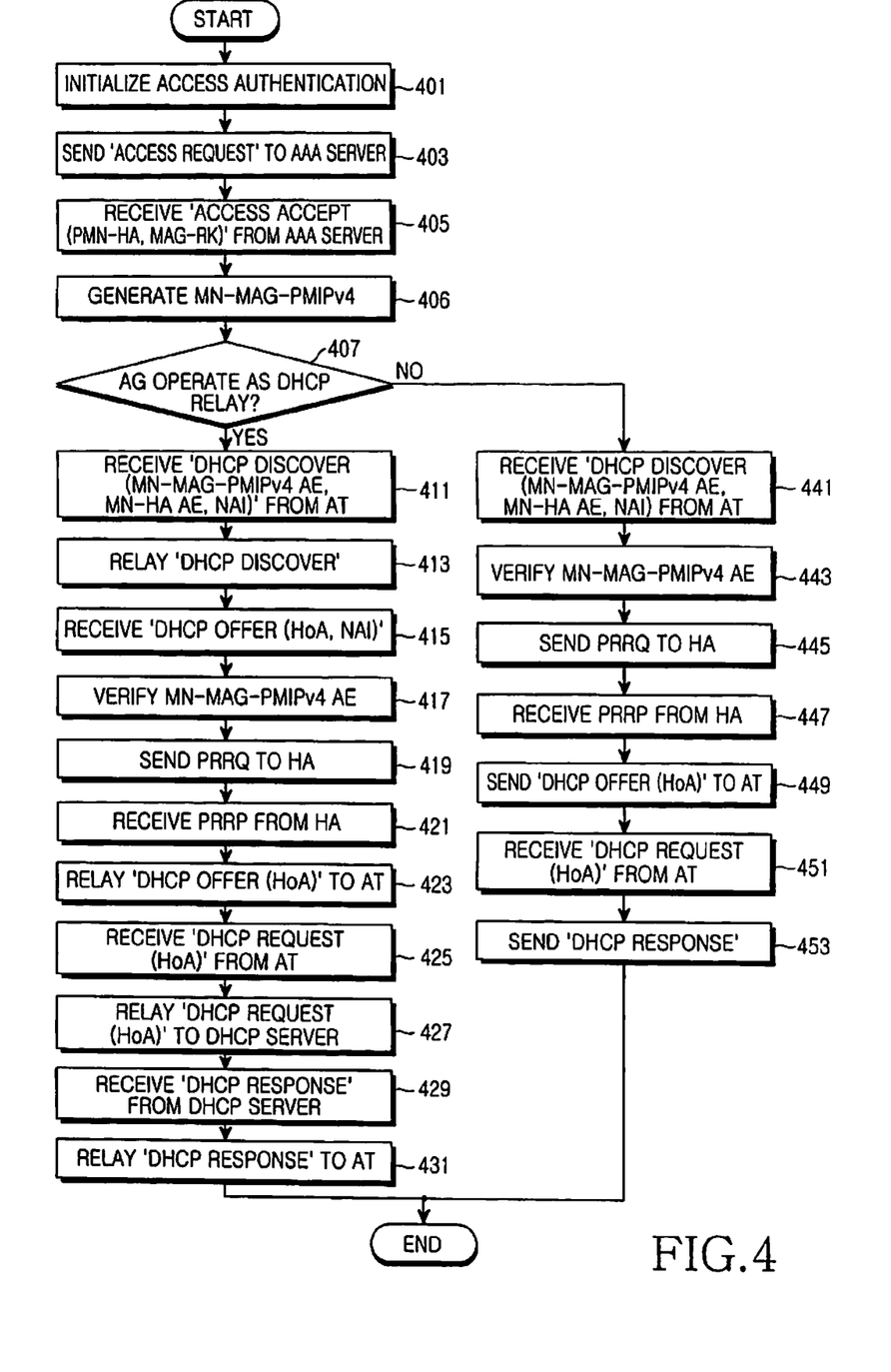
FIG. 4 is a flowchart illustrating an operation of an AG according to an embodiment of the present invention.

FIG. 4 is a flowchart illustrating an operation of an AG according to an embodiment of the present invention. Referring to FIG. 4, in step 401, an access authentication process based on other network entities including an AG is initialized, and a part of the access authentication process is performed. The access authentication includes at least one of device authentication and user authentication. In step 403, the AG sends an Access Request message for requesting an Access Accept of the AT to an AAA server as a part of the access authentication process. In step 405, the AG receives from the AAA server an Access Accept message including at least one of a PMN-HA key and an MAG-RK. In step 406, the AG generates a MN-MAG-PMIPv4 key from the MAG-RK, and the MN-MAG-PMIPv4 key is used later for mutual authentication between the AT and the AG, i.e., for verification of an MN-MAG-PMNIPv4 AE.

If it is determined in step 407 that a separate DHCP server is used in the network and the AG serves as a DHCP relay, the AG receives from the AT a DHCP Server Discover message including at least one of an MN-MAG-PMIPv4 AE, an MN-HA AE, and an NAI in step 411, and relays the DHCP Discover message to the DHCP server in step 413. In step 415, the AG receives from the DHCP server a DHCP Offer message including HoA and NAI in response to the relay of the DHCP Discover message.

After step 415, the AG performs verification on the MN-MAG-PMIPv4 AE in step 417 to check whether it is proper, and the verification is achieved by verifying the MN-MAG-PMIPv4 AE sent from the AT in step 411, using the MN-MAG-PMIPv4 key in the AG. After the verification on the MN-MAG-PMIPv4 AE is completed, the AG sends to the HA a PRRQ message for requesting registration of the moving situation of the AT on behalf of the AT in step 419, and receives a PRRP message from the HA in step 421, completing the registration into the HA. Alternatively, the verification on the MN-MAG-PMIPv4 AE in step 417 can be also performed after step 411.

In step 423, the AG relays the DHCP Offer message including HoA to the AT to notify the AT of its available HoA. Upon receiving from the AT a DHCP Request message indicating an intention to use the HoA allocated to the AT in step 425, the AG relays the DHCP Request message with HoA to the DHCP server in step 427. Thereafter, upon receiving from the DHCP server a DHCP ACK message for finally accepting the address allocated to the AT in step 429, the AG relays the DHCP ACK message to the AT in step 431.

Although steps 419 to 421 are followed herein by steps 423 to 431 for illustrative purposes, steps 419 to 421 and steps 423 to 431 can be carried out in parallel.

However, if it is determined in step 407 that a DHCP server is used in the network but it does not serves as a DHCP relay, the AG carries out the required minimum function of the DHCP server. Therefore, in step 441, a DHCP Server Discover message including an MN-MAG-PMIPv4 AE, an MN-HA AE and an NAI is received at the AG from the AT.

After step 441, the AG performs verification on the MN-MAG-PMIPv4 AE in step 443 to check whether it is proper, and the verification is achieved by verifying the MN-MAG-PMIPv4 AE sent from the AT in step 441, using the MN-MAG-PMIPv4 key in the AG After the verification on the MN-MAG-PMIPv4 AE is completed, the AG sends to the HA a PRRQ message for requesting registration of the moving situation of the AT on behalf of the AT in step 445, and receives a PRRP message from the HA in step 447, completing the registration into the HA. Thereafter, the AG notifies the AT of its allocated HoA by means of a DHCP Offer message in step 449, and receives an accept intention to use the allocated HoA from the AT by means of a DHCP Request message in step 451. Thereafter, in step 453, the AG sends to the AT a DHCP ACK message for accepting the use of the HoA allocated to the AT.

Although steps 445 to 447 are followed herein by steps 449 to 453 for illustrative purposes, steps 445 to 447 and steps 449 to 453 can be performed in parallel.

As is apparent from the foregoing description, the present invention addresses the time delay problem occurring in the call setup process in Mobile IP environment, and also performs authentication and address allocation related to IP call processing in the PMIP process, thereby ensuring a secure, fast data communication.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for managing mobility of an Access Terminal (AT) using a Proxy Mobile Internet Protocol (PMIP) in a mobile communication system, the method comprising:
    performing access authentication between the AT and an Authentication, Authorization, and Accounting (AAA) server;
    sending, by the AT, a Dynamic Host Configuration Protocol (DHCP) Server Discover message including first relevant information for authentication check to an Access Gateway (AG);
    upon receipt of the DHCP Server Discover message, sending, by the AG, a Proxy Registration Request message including second relevant information for mobility management for the AT to a Home Agent (HA);
    receiving, by the AG, a Proxy Registration Response message indicating a successful reception of the Proxy Registration Request message, from the HA;
    upon receipt of the Proxy Registration Response message, sending, by the AG, a DHCP Offer message, which is received by the AG from a DHCP server, including a Home Address (HoA) of a corresponding AT, to the AT; and
    sending, by the AG, a DHCP Acknowledgement (ACK) message, which is received by the AG from the DHCP server, for accepting use of the HoA, to the AT, when the AT notifies the AG of its intention to use the HoA,
    wherein sending, by the AT, the Dynamic Host Configuration Protocol (DHCP) Server Discover message comprises sending at least one of key information for mutual authentication between the AT and the AG, key information for mutual authentication between the AT and the HA, and a Network Access Identifier (NAI) of the AT.

2. The method of claim 1, wherein the PMIP uses PMIP version 4 (PMIPv4).

3. The method of claim 1, wherein sending, by the AG, the Proxy Registration Request message comprises sending a Home Network (HN) Prefix of the AT.

4. The method of claim 1, wherein the HoA of the AT is allocated by the AG having a DHCP function.

5. A mobile communication system using a Proxy Mobile Internet Protocol (PMIP), the system comprising:
    an Access Terminal (AT) for sending to the mobile communication system a Dynamic Host Configuration Protocol (DHCP) Server Discover message including first relevant information for checking access authentication;
    an Authentication, Authorization, and Accounting (AAA) server for performing the access authentication on the AT;
    a Home Agent (HA) for performing mobility management on the AT; and
    an Access Gateway (AG) for sending a Proxy Registration Request message including second relevant information for mobility management for the AT to the HA, upon receipt of the DHCP Server Discover message from the AT, and sending to the AT a DHCP Offer message including a Home Address (HoA) of a corresponding AT, upon receipt of a Proxy Registration Response message indicating a successful reception of the Proxy Registration Request message from the HA,
    wherein the first relevant information comprises at least one of:
    key information for mutual authentication between the AT and the AG;
    key information for mutual authentication between the AT and the HA; and a Network Access Identifier (NAI) of the AT.

6. The mobile communication system of claim 5, wherein the PMIP comprises PMIP version 4 (PMIPv4).

7. The mobile communication system of claim 5, wherein the second relevant information comprises a Home Network (HN) Prefix of the AT.

8. The mobile communication system of claim 5, wherein the AG comprises a DHCP function element, and allocates the HoA of the AT.

9. A Home Address (HoA) allocation method for mobility support of an Access Terminal (AT) in a mobile communication system using a Proxy Mobile Internet Protocol (PMIP), the method comprising:
    receiving a Dynamic Host Configuration Protocol (DHCP) Server Discover message for checking access authentication, from the AT; sending, by an Access Gateway (AG), a Proxy Registration Request message for mobility management for the AT to a Home Agent (HA); and
    allocating, by the AG, an HoA of a corresponding AT to the AT by performing a DHCP function, upon receiving from the HA a Proxy Registration Response message indicating a successful reception of the Proxy Registration Request message, and sending a DHCP Offer message including the HoA to the AT,
    wherein receiving the Dynamic Host Configuration Protocol (DHCP) Server Discover message comprises receiving at least one of key information for mutual authentication between the AT and the AG, key information for mutual authentication between the AT and the HA, and a Network Access Identifier (NAI) of the AT.

10. The HoA allocation method of claim 9, wherein the PMIP uses PMIP version 4 (PMIPv4).

11. The HoA allocation method of claim 9, wherein the Proxy Registration Request message includes a Home Network (HN) Prefix of the AT.

12. The HoA allocation method of claim 9, further comprising:
    upon receipt of the Proxy Registration Request message, sending, by the HA, an Access Request message including an HN Prefix of the AT to an Authentication, Authorization, and Accounting (AAA) server that performs access authentication on the AT; and
    receiving in response to the Access Request message, by the HA, an Access Accept message of the AT from the AAA server.

13. A mobile communication system using a Proxy Mobile Internet Protocol (PMIP), the system comprising:
    a Home Agent (HA) for performing mobility management on an Access Terminal (AT); and an Access Gateway (AG) for, upon receiving from the AT a Dynamic Host Configuration Protocol (DHCP) Server Discover message for checking access authentication, sending a Proxy Registration Request message for mobility management for the AT to the HA, allocating a Home Address (HoA) of a corresponding AT to the AT by performing a DHCP function, upon receiving from the HA a Proxy Registration Response message indicating a successful reception of the Proxy Registration Request message, and sending a DHCP Offer message including the HoA to the AT, wherein the Dynamic Host Configuration Protocol (DHCP) Server Discover message comprises at least one of key information for mutual authentication between the AT and the AG, key information for mutual authentication between the AT and the HA, and a Network Access Identifier (NAI) of the AT.

14. The mobile communication system of claim 13, wherein the PMIP comprises PMIP version 4 (PMIPv4).

15. The mobile communication system of claim 13, wherein the Proxy Registration Request message comprises a Home Network (HN) Prefix of the AT.

* * * * *